United States Patent
Ramsauer

[19]
[11] Patent Number: 6,053,018
[45] Date of Patent: Apr. 25, 2000

[54] SECURITY DEVICE FOR THE LOCK ON A SWITCHGEAR-CABINET DOOR, MACHINE HOUSING, ETC.

[76] Inventor: Dieter Ramsauer, Am Neuhauskothen 20, D-42555 Velbert, Germany

[21] Appl. No.: 08/952,190

[22] PCT Filed: Mar. 14, 1996

[86] PCT No.: PCT/EP96/01079

§ 371 Date: Nov. 7, 1997

§ 102(e) Date: Nov. 7, 1997

[87] PCT Pub. No.: WO96/35851

PCT Pub. Date: Nov. 14, 1996

[30] Foreign Application Priority Data

May 9, 1995 [DE] Germany ................ 295 07 654 U

[51] Int. Cl.[7] .................................................. E05B 13/10
[52] U.S. Cl. .............................. 70/208; 109/44; 70/197; 70/215; 70/224
[58] Field of Search ................ 70/197, 200, 208, 70/215, DIG. 49, 102, 105, 84, 283, 224; 109/44

[56] References Cited

U.S. PATENT DOCUMENTS

| | | | |
|---|---|---|---|
| 2,394,719 | 12/1946 | Schoch | 70/208 |
| 3,745,796 | 7/1973 | Fleming | 70/208 |
| 4,287,733 | 9/1981 | Gomez Olea | 70/413 |
| 4,510,779 | 4/1985 | Ahad | 70/208 |
| 4,717,794 | 1/1988 | Paul et al. | 292/DIG. 69 |
| 4,930,325 | 6/1990 | Ramsauer | 70/215 |
| 5,457,971 | 10/1995 | Yamada | 70/208 |

FOREIGN PATENT DOCUMENTS

| | | | |
|---|---|---|---|
| 261266 | 9/1986 | European Pat. Off. . | |
| 635612 | 6/1994 | European Pat. Off. . | |
| 729425 | 12/1942 | Germany | 70/208 |
| 4302835 | 6/1994 | Germany . | |
| 1286763 | 8/1972 | United Kingdom | 70/208 |
| 2041438 | 9/1980 | United Kingdom | 292/DIG. 69 |
| 2279401 | 1/1995 | United Kingdom . | |
| WO8503971 | 9/1985 | WIPO . | |

*Primary Examiner*—Darnell M. Boucher
*Attorney, Agent, or Firm*—McAulay Nissen Goldberg Kiel & Hand, LLP

[57] ABSTRACT

Described is a security device for the lock on a switchgear-cabinet door, a machine housing or similar equipment, the device consisting of a first element (54) attached e.g. to the door (12) and a second element (44) attached e.g. to the door frame or machine-housing frame (24), the two elements (54, 44) being designed so that one can be inserted in the other and be held in this position under the control of an electrical signal, corresponding, for example, to the presence or absence of an operating signal. The invention calls, in the case of a door or machine-housing panel (12), for e.g. one element (54) to be attached to the handle (26) of a turning-handle lock (14) mounted on the door or housing panel and for the other element (44) to be attached in such a way to the door frame or housing frame (24) that this other element (44) projects out into the vicinity of the lock handle when the door is closed or the housing in place and the lock handle turned into the "locked" position.

15 Claims, 3 Drawing Sheets

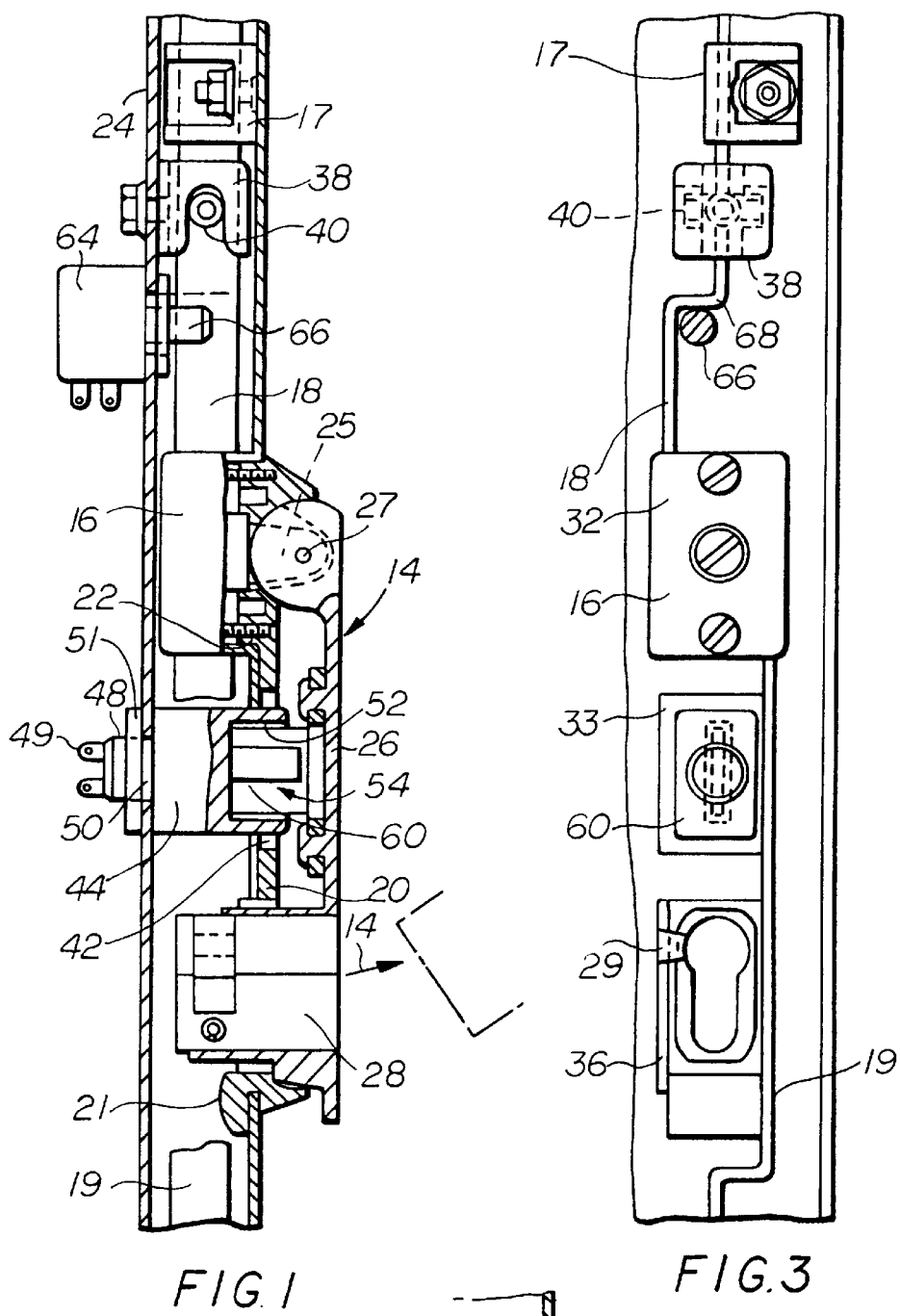
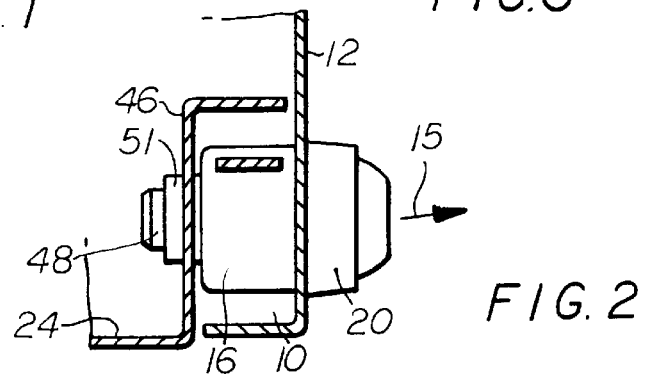
FIG. 1
FIG. 3
FIG. 2

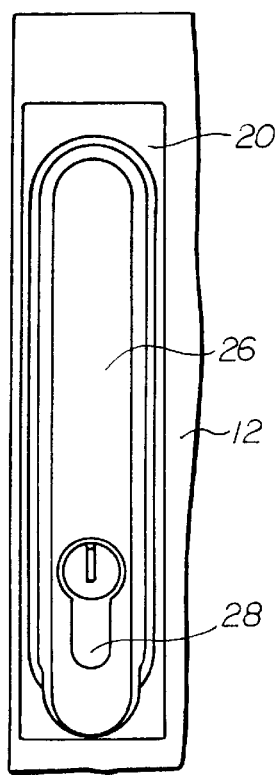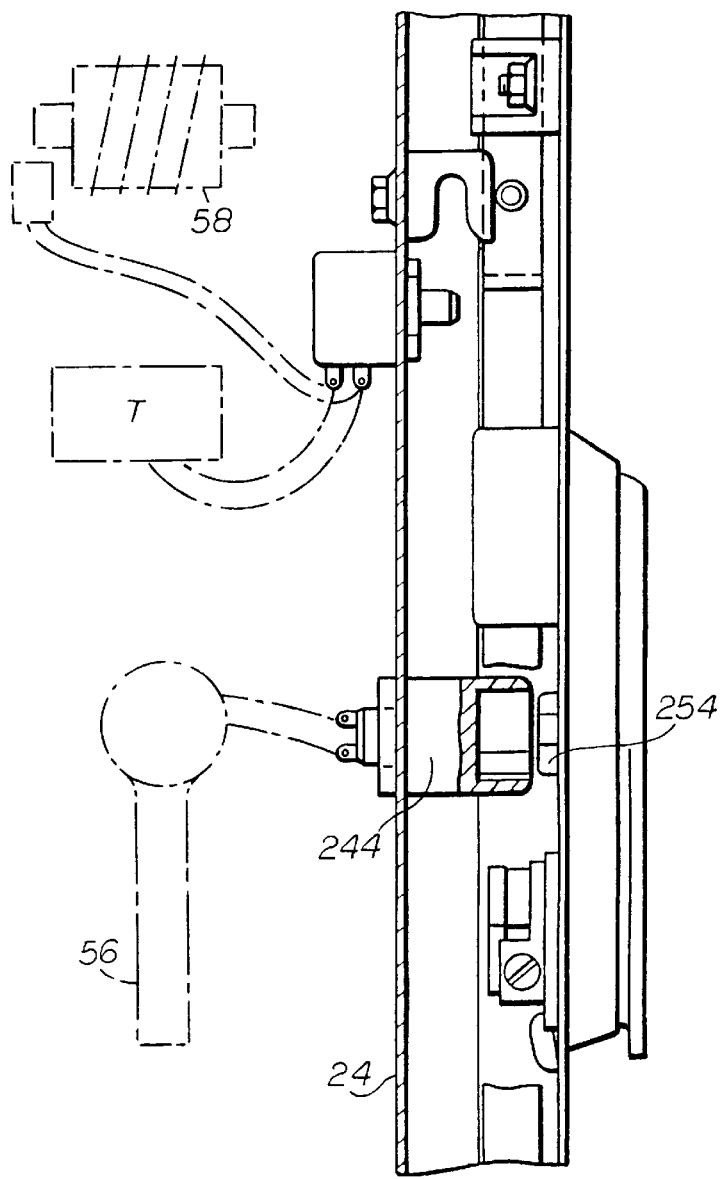
FIG. 4
FIG. 5

SECURITY DEVICE FOR THE LOCK ON A SWITCHGEAR-CABINET DOOR, MACHINE HOUSING, ETC.

TECHNICAL FIELD

The invention is directed to a swivel lever lock for the door leaf of a switch cabinet, the flap of a housing, the wall panel of a housing frame, this swivel lever lock comprising a security device.

PRIOR ART

In a security device for a switch cabinet door used within the Applicant's own enterprise and already known to the Applicant, a rotating lock can be brought into a position independent from the actual door lock such that the door is prevented from opening. This locking position of the additional rotating lock can be fixed electronically by means of an additional security device, so that unlocking is possible only under certain circumstances, for example, when no voltage is present within the interior of the cabinet.

Also known to the Applicant and used within the Applicant's own enterprise is another version provided only for small doors in which a lever-shaped lock is capable of locking the door in the closed position by its lever arm, while the oppositely located arm is held in the locking position by an electrical device when voltage is present inside the cabinet.

Apart from these embodiment forms which are known only to the Applicant, a security switch is known in general from a catalog by the company K.A. Schmersal GmbH & Co. KG, Wuppertal, page 33, which security switch is used on protective gratings, hoods and doors which must be closed to achieve the required operating security. When the protective device is closed by sliding the actuating key into one of the slots formed by the security switch, safety contacts are closed. When the protective device is opened, the safety contact is opened in a compulsory manner mechanically by pulling out the actuating key and the make-contact is closed. A disadvantage in this prior art consists in that this security switch must be provided in addition to the lock devices for, e.g., the door, which renders the arrangement more complicated.

It is the object of the invention to provide a security device of the type mentioned above in such a way that fewer, preferably no more than two, different elements are required for door locking and for security.

A further object consists in so developing the security device that additional lock arrangements can be provided which can only be opened by authorized persons.

Further, the security device is so designed that there is no risk of unintentionally tearing out the lock and thereby possibly opening it which would result in endangerment of a user who possibly unintentionally opens the door lock and can thus gain access to a switch cabinet in which voltage is still present.

In particular, an individual lock is sufficient for the door lock and for security, whereas previously the security and locking of the door, flap, wall housing or the like were effected independently from one another.

Moreover, the securable lock can have a robust construction such that even large doors are securely held closed. Further, the arrangement is carried out in such a way that the actual forces for holding the door closed are not exerted by the security device, but rather by the lock device.

The set of objectives mentioned above is met by the features of the claims.

Moreover, the securable lock can have a robust construction such that even large doors are securely held closed. Further, the arrangement is carried out in such a way that the actual forces for holding the door closed are not exerted by the security device, but rather by the lock device.

The set of objectives mentioned above is met by the features of claim 1.

In this way, it is possible to lock the door and to achieve the securing function that is additionally required in given applications by means of only one lock element.

The security device does not impede the movement of the door itself, so that there is no risk of unintentionally tearing out or damaging the security device when attempting to open the door; moreover, the locking and security device are now united in one construction according to the invention, which simplifies assembly and also provides a greater security for both functions.

The security device according to the invention enables numerous different embodiment forms. Thus, the part that is fastened to the handle of the swivel lever lock can be a permanent magnet, and the part that is fastened to the door frame or the like can be a magnet switch which, when the door is closed and the handle is folded or swiveled down, is influenced and switched by the magnetic field of the permanent magnet in such a way that an electrical circuit is opened or closed, so that a startup of operation can be effected; for example, current can be applied to the switch cabinet area isolated by the door or the machine located in the machine housing can be put into operation. When the swivel lever handle is subsequently swiveled out of its rest position or locked position, for example, from a position in which it is swiveled into a trough or cavity, in order, for example, to open the lock and, subsequently, the door, the magnet switch which is now no longer influenced by the permanent magnet moves into a different position which, for example, stops the machine arranged in the machine compartment or grounds the circuit accommodated in a switch cabinet and accordingly renders it safe for access by the user.

In accordance with a further development of the invention, the part fastened to the handle has a shoulder which can be locked in the other part mechanically.

According to another embodiment form, for example, the part which is fastened to the swivel lever is provided with a key profile which can fit into a receiving opening in the other part fastened to the door frame or the like, this other part having a corresponding profile. When this specially shaped part having the key profile penetrates into the other part, a switch is flipped similar to the above-described embodiment form with the magnet switch, by means of which the same functions can be triggered as those described above. The advantage of this embodiment form consists in that it impedes tampering by unauthorized persons, since a special key-like part must be provided in this case which, for example, deactivates the security function when the door is open by inserting it into the part fastened to the door frame, which would be more easily achievable in the first embodiment form for unauthorized persons by means of a suitable, more easily procurable magnet. Such deactivation of the security function can be provided for maintenance purposes, but it would also be advantageous to enable specially authorized persons having corresponding special tools having the key profile to deactivate the security function.

When the key bit is shaped in such a way that it is surrounded by locking mechanisms or tumblers of the other part, the total number of security features (tumbler functions), and accordingly the security factor, can be increased on the one hand and, on the other hand, the circuit can be carried out in such a way that the two parts are fixed one inside the other, namely, for example, as long as a machine is still running or as long as there is still voltage inside the cabinet. This holding function which foils attempts to swivel the swivel lever out of its swiveled in position can accordingly be further enhanced in that one part is provided with at least one opening or hole into which at least one cross-pin or protuberance projecting from the other part can penetrate. This opening can also have an irregular profile into which the other part can fit in the manner of a key. Also in this case, the mechanical securing effect which withstands great force is combined with the security function to prevent tampering in that the security function can be deactivated only by means of special parts which fit in the manner of a key.

In particular, the one part can be a flat metal piece with notches and/or holes and, if required, with a transverse profiling, this flat metal piece being arranged at the underside of the handle lever remote from its axis of swivel. The other part, for example, a security switch, in this case has a receiving slot for the flat metal piece, wherein pins or protuberances which are movable by means of a control signal and which project into or through the slot transversely can be provided, for example, such that, if necessary, the flat metal piece introduced in the slot when the swivel lever is swiveled down is secured in this position by these pins or protuberances until, e.g., the machine inside a machine casing comes to a stop or until there is no voltage in the equipment located in a switch cabinet, whereupon a corresponding control signal retracts the pins and accordingly releases the flat metal piece, thus making it possible again to fold out the swivel lever and unlock the door so that the door can be opened.

The second part, preferably the part constituting the security switch, is arranged at a fixed point with respect to the frame in such a way that, when the door is closed and the handle is swiveled into the cavity, this second part extends through the door leaf and, if required, into the cavity up to the swiveled in swivel handle, so that pins projecting from the security switch enter through the hole in the flat metal piece and can accordingly secure the latter.

A particularly advantageous application is a bar lock which can be actuated by means of a swivel lever, in which case a bar projection or angle surface can be provided at one of the bars, which, when an attempt is made to open the bar lock, moves up against the stop surface or stop pin of a magnet barrier or of a switch feeler when this magnet barrier is in its securing position, for example, triggered by a machine which is still in operation or by the continued presence of voltage in the switch cabinet. This blocking could be canceled when, for example, the machine comes to a stop or when voltage is eliminated in the interior of a switch cabinet by a main switch, whereupon a corresponding signal reaches the magnet switch and causes this magnet switch to release the surface or bar projection so that the bar lock can be actuated such that the door can be opened.

In addition to the electrical security devices described above, the swivel lever can also have a lock which, for example, can be actuated mechanically by a key and which, for example, may be arranged on the swivel lever handle so as to be axially offset relative to the electrical safety.

In a particularly advantageous embodiment form, the second part, e.g., the part having the shape of a flat box, is screwed onto the surface of a sheet-metal cabinet door frame fold or bevel facing the interior of the cabinet by a projection which projects through a hole in this surface and through another hole in the door leaf which is aligned with the first hole (when this door leaf is in the closed position), which projection then extends as far as the swivel lever in the manner described above so as to receive in that location the first part proceeding from the swivel handle.

BRIEF DESCRIPTION OF THE INVENTION

The invention is explained more fully hereinafter with reference to embodiment examples shown in the drawings.

FIG. 1 is an axial sectional view of a bar lock with swivel lever actuation and additional security device according to a first embodiment form of the invention;

FIG. 2 is a cross-sectional view through the arrangement according to FIG. 1;

FIG. 3 is a rear view of the arrangement according to FIG. 1;

FIG. 4 is a plan view from the front of the arrangement according to FIG. 1;

FIG. 5 is a plan view similar to FIG. 1, wherein the door is shown in the opened, ajar position, but with the swivel lever in the swiveled in position;

BEST MODES OF CARRYING OUT THE INVENTION

Figure 6:
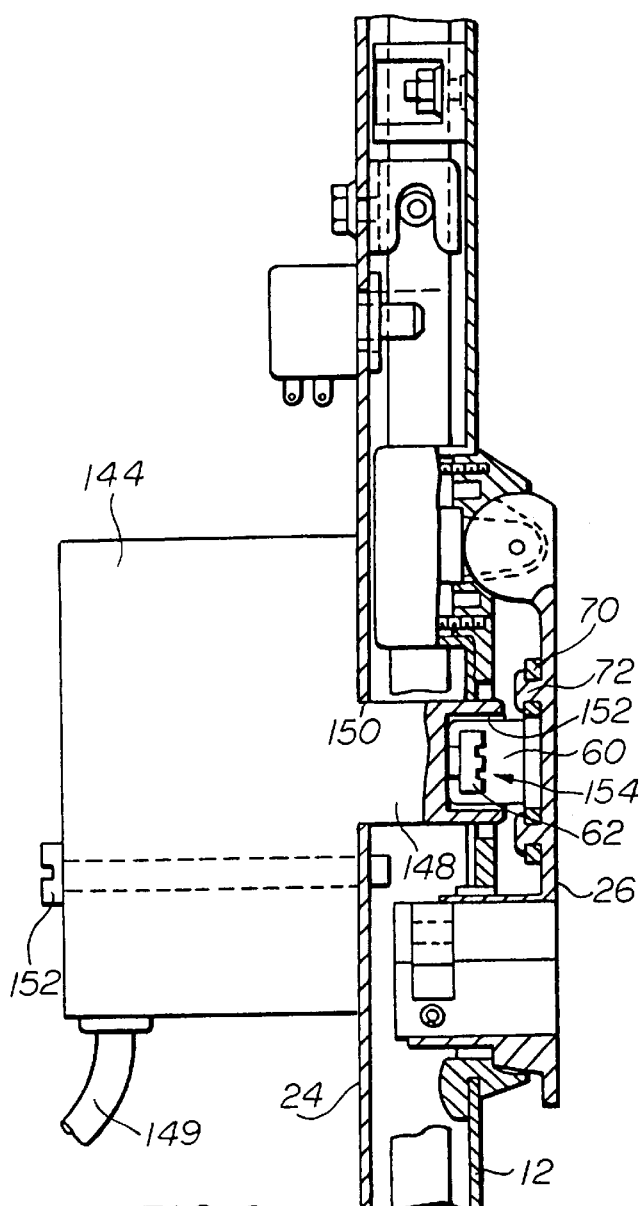
FIG. 6 is a plan view similar to FIG. 1 showing another embodiment form of the invention.

FIG. 1 is a longitudinal sectional view showing a swivel lever bar lock 14 which is arranged in the folded space or bevel space 10 (see FIG. 2 for a cross-sectional view) formed between the beveled door leaf 12 and the beveled opening area of a sheet-metal cabinet body 24. In the arrangement shown in the Figure, the swivel lever bar lock comprises a lock 16 from which bars 18, 19 project so as to extend in the bevel space 10 and are supported inside the lock 16 on one side and, on the other side, also in a displaceable manner at bar guides 17 fastened to the door leaf 12.

The door leaf 12 is articulated at the cabinet body 24 in such a way that it can be swiveled away from the frame region 24 (FIG. 2) in the direction of the arrow 15 shown in FIG. 2.

A base plate or receptacle cavity 20 projects through door leaf holes 36 and 32 by shoulders 21 and 22 projecting from this base plate or receptacle cavity 20, wherein the plate or receptacle cavity 20 is secured in the door leaf by means of a hook (at 21) or a screwed on cover cap (at 22).

By means of a pinion arrangement, details of which are not pertinent for present purposes, within the lock casing 16, the locking bars 18, 19 are displaced in the axial direction when an actuating pin 25 connected with the pinion is rotated by the actuating lever 26. The actuating lever 26 is articulated at the actuating pin 25 by means of a swivel pin 27, while the free end of the actuating lever 26 carries a cylinder lock 28 which, when the lever 26 is swiveled into the cavity 20, can penetrate into an opening formed by this cavity in such a way that the cylinder lock cog or thumb 29 can slide behind a stop surface formed by the cavity 20 and thus enables the lever 26 to lock m its swiveled in position. As can further be seen from FIG. 1, a hook-like projection 38 is screwed onto the cabinet body 24. A double roller pivot 40 carried by the lock bar 18 penetrates into this hook-like projection 38 when the bar lock is closed and thus forms a lock which prevents the door from opening in the illustrated position of the double roller pivot and hook. The U-shaped hook 38 receives the bar 18 between its legs and is securely screwed to the cabinet body by its web region by means of a screw as can be seen from FIGS. 1 and 3. The bar guide 17 itself is fastened to the door leaf 12 by means of a stud bolt arrangement, so that the door leaf 12 is secured with respect to the door frame 24 by means of the lock bar 18 and can accordingly not be swiveled up in the direction of the arrow 15 shown in FIG. 2. Only after the swivel lever 26 has been swiveled out of its position shown in FIG. 1 in the direction of arrow 41 around the pin 27 to the extent that it can be turned around the axis of the actuating pin 25 can the lock bar 18 (and thus also the lock bar 19) be displaced axially to such an extent in the direction of the lock casing 16 by means of this rotating process of the pin 25 along the pinion (not shown) that the double roller pivot 40 (or some other locking pivot) is released from the region of the hook 38 and the door leaf 12 can accordingly be swiveled in the direction of arrow 15 so that the door can be opened.

An electronic security part 44 extends through the additional hole 33 in the door leaf 12 which continues into a corresponding hole 42 in the receptacle cavity 20. This electronic security part 44 is mounted in this case on the beveled part 46 (see FIG. 2) extending parallel to the door leaf 12 in that, according to the embodiment form shown in FIGS. 1 and 2, a threaded shoulder 48 projecting from the part of the electric security part 44 attached to the outer surface of the beveled part 46 extends through an opening 50 in the bevel 46 and is mounted by means of a union nut 51 which is screwed on.

In contrast, in the embodiment form according to FIG. 6, the electrical security part 144 shown in FIG. 6 is attached from the other side of the bevel part 46 and passes through an opening 150 with its shoulder 148 and is fastened to the door frame 24 by a screw bolt arrangement 12.

The electrical security part 44 or 144 has electrical contact connections 49 and corresponding connection cables 149 by which electrical signals or electrical power can be supplied or discharged.

The security part 44 or 144 has, at its part facing the swivel lever 26, a receiving area such as a slot or recess 52 and 152 in which there extends an additional security part 54 or 154 carried by the swivel lever 26 when the door is closed and the swivel lever 26 is in its swiveled in position as is shown in FIGS. 1 and 6.

In the embodiment form shown in FIG. 1, the security part 54 fastened to the swivel lever 26 can be a permanent magnet, while the other security part 44 fastened to the door frame 24 could be a magnet switch which, for example, is switched on by the permanent magnet when the two parts are situated relative to one another in the position shown in FIG. 1, i.e., in a position in which the door is completely closed and the swivel lever is located in its swiveled in position. This switch-on process for the magnet switch generated by the permanent magnet could be used to generate an electrical signal and to send this signal to a control device which would in turn make it possible to initiate operation of the equipment located in the associated switching cabinet. If, on the contrary, the swivel lever is swiveled out of its illustrated position or if the door leaf is not in its completely closed position (e.g., see FIG. 5), the second security part 254, for example, the permanent magnet, is not located inside the first security part 244 fastened to the door frame, and this security part 244 generates a signal or interrupts a signal in such a way that the interior of the cabinet, e.g., has no voltage or in such a way that voltage cannot be supplied, or, in the case of a machine housing, prevents this machine from being put into operation or prevents it from continuing to operate. This means that an incorrectly closed door prevents a main switch 56 from being closed in spite of the fact that the handle lever is swiveled in.

The security function can be further expanded in the following manner. For example, in order to prevent the swivel handle from being swiveled out so as to open the door while the machine 58 (FIG. 5) which has, e.g., knife rollers, is still in operation, a magnetic field could be produced, for example, by means of a continuous electric current, which magnetic field attracts the permanent magnet of part 254 (or a soft-iron part) to such an extent that the swivel lever is prevented, or at least substantially hindered, from swiveling out while the machine is still running.

An even greater security effect in this respect is achieved, for example, in that, instead of a permanent magnet 254 according to FIG. 6, the security part 154 located at the handle has a shoulder 60 or 160 which can be locked mechanically in the other part 44 or 144 when received therein. This locking process can be triggered electronically.

In order to prevent tampering in which the insertion of an improper object into the security part 44 or 144 causes the protected machine arrangement to be switched on, the arrangement according to the invention can be further developed in such a way that the security part 60 of 160, preferably the security part located at the handle, has a key profile such as that shown in FIG. 3, wherein the part can be received so as to fit into a receiving opening 52 of the other part, preferably the part fastened to the door frame, which receiving opening has a corresponding profile. This means that only one tool or projection having a corresponding profile is capable of unlocking or starting the equipment to be protected.

Figure 8:
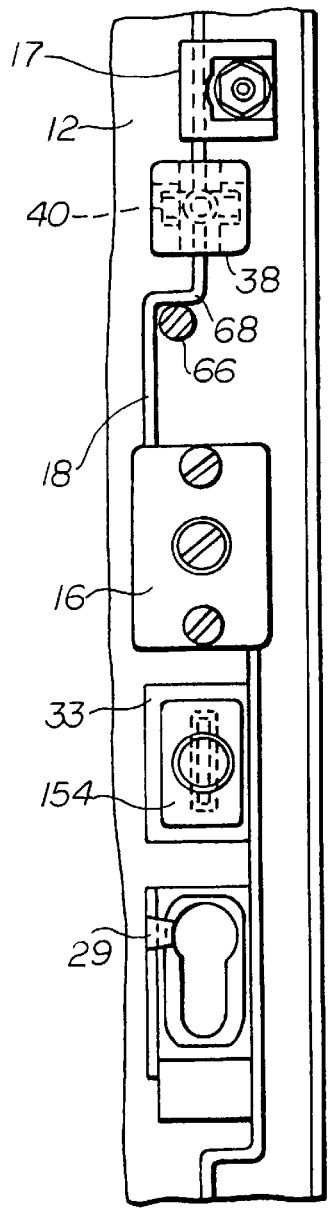
FIG. 8 shows a rear view similar to the view of the arrangement in FIG. 6.

The security function can also be improved in that the shoulder has not only one profile or no profile, but rather comprises in addition, or instead of this profile, a key bit arrangement in which tumblers of the other part can engage. Thus, the security part 154 shown in FIG. 6 has not only a cross-sectional profile (see, e.g., FIG. 8), but, rather, this structural component part, which is designed in this case as a flat metal piece, also has an irregularly profiled hole 62 in which pins, protuberances or the like projecting from the shoulder 148 into the opening 152 of the other security part 144 can penetrate in such a way that, on the one hand, the security part 154 is held immovably in the pushed in position and, on the other hand, it can be determined that the correct security part is actually located within the opening 152 with the correct irregularly profiled hole 62 and with the corresponding cross-sectional profile; in which case exclusively, a signal, for example, which starts or makes it possible to start the machine or the switching equipment to be protected by the door leaf can be diverted via the cable 149.

Another protective arrangement is realized according to Fig. 1 by a magnet barrier 64. As long as the machine 58 is running and as long as a timer element T has not yet been triggered after the machine is switched off, a blocking pin 66 projecting from the magnet barrier 64 is situated in the path of an angle surface 68 of the lock bar 18. Not until the machine stops or until the timer switch has been triggered after the expiration of the time period required for stopping is a signal sent to the magnet barrier 64 causing this blocking member to retract the pin 66 far enough so that the angle surface 68 can pass by it, so that it is now possible to displace the lock bar 18 in the direction of the lock 16 and accordingly to cancel the locking of the door and open the door. This pin 66 can also be arranged in such a way that it extends into the lock casing 16, for example, and blocks the pinion movement therein.

The fastening of the security part 54 or 154 at the swivel lever can preferably be effected by means of a base plate 70 which, for example, is glued on in the interior of the cavity-like handle lever 26 or is fixed already during the injection molding of this handle lever by a protruding portion 72 of the handle lever material which projects through suitable openings in the base plate during the injection molding process and accordingly secures the plate at the handle lever.

Figure 7:
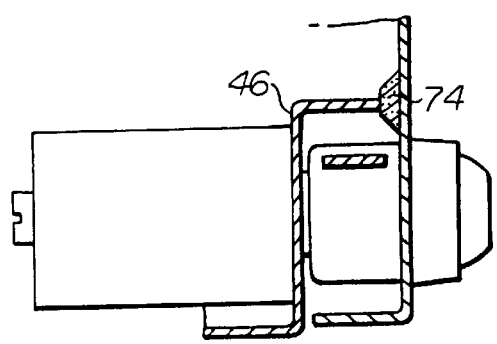
FIG. 7 shows a cross-sectional view of the arrangement according to FIG. 6.

As follows from FIG. 7, the security part 144 closes the through-opening 150 provided in the surface 146—with the intermediary of several sealing sheets if required—so as to maintain a gastight closure between the interior of the cabinet or the like and the exterior of the cabinet which is effected by means of a sealing strip 74, so that the new arrangement does not impair the gastight closure of a switch cabinet.

The device according to the invention accordingly makes it possible by means of a modified swivel lever lock of conventional construction, per se, not only to secure by means of the cylinder key lock mechanism, but also simultaneously to effect an additional locking in case access to a user must be blocked for reasons of operating safety, such as a machine that is still running inside a machine housing or the presence of voltage in switching equipment inside a switching cabinet.

Additional security devices further make it possible that the equipment can be started again only with a security part of the swivel lever or of the part fastened to the door frame which has the correct configuration, e.g., is provided with the corresponding profiles, and only when the door is completely closed and the swivel lever is swiveled in, and not for example by a substitute security part. If it should be necessary to start up the equipment when the door is open for maintenance purposes, this can only take place when a correspondingly shaped key-like security part such as that fastened to the swivel lever is inserted into the other security part, wherein a very high level of security can be achieved by means of the various tumblers and profiles; for example, many tens of thousands of alternatives can be realized given a suitable shaping of the profiles, only one of these alternatives being effective.

The present arrangement also has the great advantage that the door closing forces need not be applied by the security device, but rather by normal locking devices of the door lock especially which are provided for this purpose and which are not identical to the security device itself.

COMMERCIAL APPLICABILITY

The security device according to the invention is commercially applicable in the field of control technology.

What is claimed is:

1. Swivel lever lock for use with a door leaf, said swivel lever lock comprising:
   a security device adapted to be fastened to the door leaf; said security device having an actuating lever adapted to be swiveled out, said security device locking the door leaf to a frame when the door leaf is closed onto the frame and said actuating lever is not swiveled out and unlocking the door leaf from the frame when said actuating lever is swiveled out, said swivel lever lock also having a first part adapted to be fastened to the actuating lever and a second part adapted to be fastened to the frame, one of said first and second parts being adapted to be insertable within another of said first and second parts when the door leaf is closed onto the frame and said actuating lever is not swiveled out, one of said first and second parts supplying an electrical signal indicative of whether said one of said first and second parts is inserted within said another of said first and second parts, said first part having a shoulder adapted to be mechanically locked in said second part, one of said first and second parts being a flat metal piece with notches or holes of regular or irregular shape and with a transverse profiling, said flat metal piece being arranged at the underside of the swivel lever remote from a swivel axis of the swivel lever, the other of said first and second parts being a security switch which has a slot adapted to receive the flat metal piece, and pins or protuberances being movable in response to control signals or generate control signals and project through or into the receiving slot are provided therein.

2. Swivel lever lock for use with a door leaf, said swivel lever lock comprising:
   a security device adapted to be fastened to the door leaf; said security device having an actuating lever adapted to be swiveled out, said security device locking the door leaf to a frame when the door leaf is closed onto the frame and said actuating lever is not swiveled out and unlocking the door leaf from the frame when said actuating lever is swiveled out, said swivel lever lock also having a first part adapted to be fastened to the actuating lever and a second part adapted to be fastened to the frame, one of said first and second parts being adapted to be insertable within another of said first and second parts when the door leaf is closed onto the frame and said actuating lever is not swiveled out, one of said first and second parts supplying an electrical signal indicative of whether said one of said first and second parts is inserted within said another of said first and second parts, the swivel lever lock having a cavity, and the second part being arranged at a fixed point with respect to the frame in such a way that, when the door leaf is closed and the actuating lever is swiveled into the cavity, said second part extends through an opening in the cavity up to the region of the actuating lever facing the door leaf.

3. The swivel lever lock according to claim 2, wherein said first part is a permanent magnet, and said second part is a magnetic switch.

4. The swivel lever lock according to claim 2, wherein said first part has a shoulder adapted to be mechanically locked in said second part.

5. The swivel lever lock according to claim 2, wherein said first part has a key profile adapted to be fit into a receiving opening in said second part, said receiving opening having a profile corresponding to said key profile.

6. The swivel lever lock according to claim 4, wherein said one of said first and second parts includes a key bit, and the other of said first and second parts includes locking mechanisms or tumblers, said key bit being adapted to engage said locking mechanisms or tumblers.

7. The swivel lever lock according to claim 4, wherein said one of said first and second parts includes at least one cross-pin or protuberance projecting therefrom; and said other of said first and second parts includes at least one opening or hole into which said at least one cross-pin or protuberance is adapted to penetrate.

8. The swivel lever lock according to claim 7, wherein the opening or hole has an irregular profile, and the cross-pin arrangement or protuberance arrangement is adapted to penetrate said irregular profile of the opening or hole.

9. The swivel lever lock according to claim 4, wherein one of said first and second parts is a flat metal piece with notches or holes of regular or irregular shape and with a transverse profiling, said flat metal piece being arranged at the underside of the swivel lever remote from a swivel axis of the swivel lever.

10. The swivel lever lock according to claim 2, wherein the security device includes a bar lock, said bar lock having a bar with a projection or angle which is adapted to move against a blocking projection when movement is effected in an opening direction, and said blocking projection is adapted to be moved out of a movement area of the projection or of the angle surface in response to an electrical signal.

11. The swivel lever lock according to claim 2, wherein the actuating lever has an additional lock adapted to be released mechanically by a key, said additional lock adapted to releasably hold the actuating lever in the swiveled in position.

12. The swivel lever lock according to claim 11, wherein the additional lock is arranged in a region of articulation of the actuating lever or in a region of a free end of the actuating lever.

13. Swivel lever lock for use with a door leaf, said swivel lever lock comprising:

a security device adapted to be fastened to the door leaf; said security device having an actuating lever adapted to be swiveled out, said security device locking the door leaf to a frame when the door leaf is closed onto the frame and said actuating lever is not swiveled out and unlocking the door leaf from the frame when said actuating lever is swiveled out, said swivel lever lock also having a first part adapted to be fastened to the actuating lever and a second part adapted to be fastened to the frame, one of said first and second parts being adapted to be insertable within another of said first and second parts when the door leaf is closed onto the frame and said actuating lever is not swiveled out, one of said first and second parts supplying an electrical signal indicative of whether said one of said first and second parts is inserted within said another of said first and second parts, the second part being arranged on an outward-facing surface of a frame bevel of said frame and being adapted to extend through a hole arranged in the door leaf when the door is closed.

14. Swivel lever lock for use with a door leaf, said swivel lever lock comprising:

a security device adapted to be fastened to the door leaf; said security device having an actuating lever adapted to be swiveled out, said security device locking the door leaf to a frame when the door leaf is closed onto the frame and said actuating lever is not swiveled out and unlocking the door leaf from the frame when said actuating lever is swiveled out, said swivel lever lock also having a first part adapted to be fastened to the actuating lever and a second part adapted to be fastened to the frame, one of said first and second parts being adapted to be insertable within another of said first and second parts when the door leaf is closed onto the frame and said actuating lever is not swiveled out, one of said first and second parts supplying an electrical signal indicative of whether said one of said first and second parts is inserted within said another of said first and second parts, the second part being arranged on a surface of a frame bevel of the frame facing an interior of a housing and being adapted to extend through a hole formed in the door leaf when the door is closed.

15. Swivel lever lock for use with a door leaf, said swivel lever lock comprising:

a security device adapted to be fastened to the door leaf; said security device having an actuating lever adapted to be swiveled out, said security device locking the door leaf to a frame when the door leaf is closed onto the frame and said actuating lever is not swiveled out and unlocking the door leaf from the frame when said actuating lever is swiveled out, said swivel lever lock also having a first part adapted to be fastened to the actuating lever and a second part adapted to be fastened to the frame, one of said first and second parts being adapted to be insertable within another of said first and second parts when the door leaf is closed onto the frame and said actuating lever is not swiveled out, one of said first and second parts supplying an electrical signal indicative of whether said one of said first and second parts is inserted within said another of said first and second parts, a lock bar adapted to lock the door leaf to the frame when the door leaf is closed onto the frame and said actuating lever is not swiveled out, a lock casing through which said lock bar extends, and a blocking pin movably coupled to said frame which is adapted to move through the lock casing and through the lock bar thereby preventing the lock bar from disengaging from the frame, said blocking pin being adapted to be controlled by an electrical signal representing a predetermined activity or passage of time.

* * * * *